Feb. 19, 1952 C. E. McCLELLAN 2,586,365
MEANS FOR ELIMINATING SPURIOUS FREQUENCIES
Filed March 20, 1947
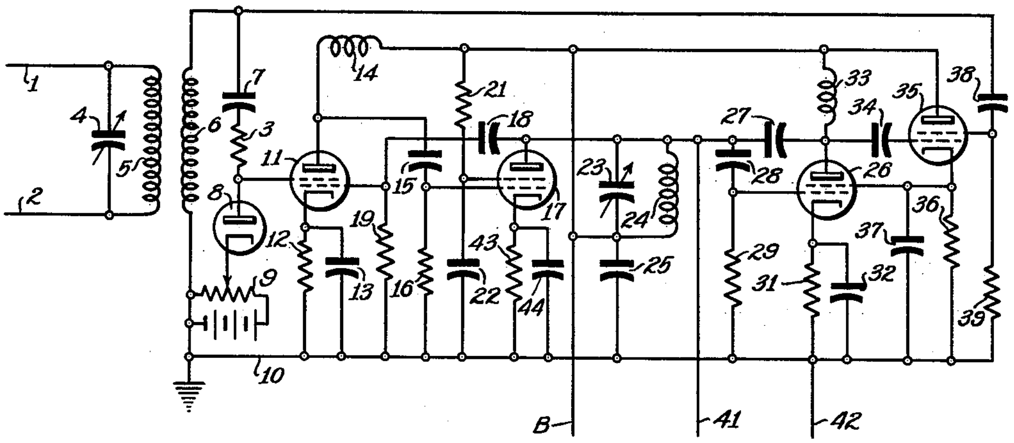
WITNESSES:
Robert C. Baird
Wm. L. Groome
INVENTOR
Cyril E. McClellan.
BY
F. W. Lyle.
ATTORNEY Patented Feb. 19, 1952

2,586,365

UNITED STATES PATENT OFFICE 2,586,365

MEANS FOR ELIMINATING SPURIOUS FREQUENCIES

Cyril E. McClellan, Catonsville, Md., assignor to Westinghouse Electric Corporation, East Pittsburgh, Pa., a corporation of Pennsylvania Application March 20, 1947, Serial No. 736,033

2 Claims. (Cl. 178—44)

For many purposes, in the field of radio, it is desirable to be able to energize an output circuit of a single frequency selected from a number of different frequencies present in an input circuit. For example, where it is desired to be able to vary the frequency of an output circuit with precision over an extremely wide range of values, the prior art has heterodyned the output of one or more crystal-controlled oscillation generators with the output of other oscillation generators of which the frequency may be varied at will, and has filtered the desired frequency from the plurality of side band and other frequencies present in the mixer output.

The properties of resonant circuits are such that, at least theoretically, it should be possible, by concatenating a sufficient number of resonant circuits, to reduce the undesired frequency components to any desired fraction of the selected component to which the circuits are resonated. However, when it is desired to reduce this fraction to an extremely low value, it is found that there is a practical limit to the filtering which can be achieved by means of such tuned filters, particularly where their resonant frequency is to be varied at will. I believe this to be due probably to the fact that as the sharpness of tuning and the number of the concatenated filter stages is increased, it becomes impracticable to track them mechanically with sufficient accuracy. But whatever the reason, the practical result is found that a limit on rejection of spurious and undesired frequencies by this means is reached.

One object of my invention is, accordingly, to describe a novel means by which a desired frequency may be selected from an input signal containing this frequency, together with other frequencies.

Another object of my invention is to provide a novel type of filtering arrangement by which a single frequency may be derived from a circuit energized with currents of numerous different frequencies.

Still another object of my invention is to provide a novel type of heterodyning or mixing system for alternating currents.

Other objects of my invention will become apparent upon reading the following description, taken in connection with the drawings, in which the single figure is a schematic diagram of one type of circuit embodying the principles of my invention.

As previously stated, it is possible to derive, by means of resonant filters from a circuit energized by a plurality of different frequencies, an output current in which the currents of undesired frequency have amplitudes which are only a small fraction of the desired, or dominant, frequency. Under such circumstances, the output current may be considered to be given a cyclical distortion, at a beat frequency, in phase and amplitude by each undesired frequency component, without changing the integral number of cycles per second of the dominant frequency. The purposes of my invention are attained, in effect, by removing the amplitude distortion through clipping the output waves so that they are all of the same amplitude, and by removing the effects of phase variation through employment of only the mid-portion of the resulting flat-topped waves in controlling a tank circuit.

For example, a single stage resonant filter circuit of entirely reasonable and practicable type and dimensions is capable of reducing to 5% the amplitude of frequencies which are 10% away from the resonance to which the filter is tuned. This 5% component will constitute what may be regarded as a 5% amplitude modulation of the wave of resonant frequency. At the same time, it will constitute what may be considered a phase modulation of such resonant frequency having an amplitude of phase shift such that the sine of the shift-angle is the ratio of the two amplitudes above mentioned; namely, an angle having a sine which is 5%, i. e. $\frac{1}{20}$. This angle is readily seen to be slightly under 3 degrees.

Assume now that a signal having the wave form just described is used to drive a class C amplifier. The amplitude modulation would probably be largely wiped out by the clipping action of the amplifier grid as it goes positive on the positive peak of the signal. However, this clipping action can readily be enhanced by insertion ahead of the amplifier of an external clipper of conventional design, such as are well known in the art.

In accordance with my invention, I provide the class C amplifier with a feedback circuit having sufficient feedback coupling so that the tube would readily oscillate were its grid biased to the degree normal in oscillation generators. However, I so severely bias the grid that the tube is incapable of oscillating spontaneously, but that, under the influence of clipped driving signal above mentioned, the tube becomes conductive to anode current during about one-half cycle of the impressed signal wave. The tank circuit of this oscillation generator is tuned to the input frequency and feeds voltage back to the input circuit in phase with the original input signal. This feedback may, of course, be impressed on the same grid as the input signal, but it is probably preferable to impress it on a separate grid from the one to which the driving signal is applied.

With such an arrangement, the oscillations of the amplifier tube can be made to build up to a point where plate current is drawn only at the very peak or tip of the nearly sinusoidal feedback voltage. As a result of this, it is only the mid-portion of the input signal which affects the output current of the amplifier, and remembering that the input signal is a flat-topped wave of uniform amplitude throughout its mid-portion, it will be evident that the above-mentioned three-degree phase modulation at the leading and trailing edges where the input signal wave passes through zero is without effect on the operation of the oscillator tank circuit. The current in this tank circuit, therefore, is quite free from all traces of the effect of the undesired frequency impressed on the input circuit.

The foregoing discussion was premised on the tank circuit being tuned with substantial precision to the frequency of the dominant or desired wave in the input circuit. In order to insure that the tank circuit is maintained with the necessary tuning, I provide means by which the tuning of the tank circuit is adjusted to maintain equality with the dominant input frequency. I do this by what may be termed a phase comparitor which produces an output voltage which varies in sign with departures in frequency of the dominant impressed signal frequency from the resonant frequency of the tank circuit.

With the foregoing principles in mind, they may be embodied in the circuit illustrated in the drawing, in which a pair of input terminals 1, 2 have impressed upon them an alternating-current wave comprising a number of components of different frequencies. Between the input terminals 1, 2 is connected an anti-resonant circuit comprising a variable capacitor 4 and an inductor 5. The capacitor 4 and inductor 5 are tuned to the frequency which it is desired to select from among the plurality of frequencies present in the input wave. A second inductor 6 in inductive relation with the inductor 5 has connected in shunt with it a capacitor 7, a resistor 3 and a diode 8 which is adjusted in ways well known to those skilled in the art to act as a clipper for the voltage waves induced in the winding 6. A biasing means 9 may be employed in series with the clippers 8 in order to more effectively produce this result.

The intermediate terminal of the capacitor 7 and the clipper 8 is connected to a control grid of a mixer tube 11 having a cathode connected through a cathode resistor 12 and a by-pass capacitor 13 to a negative or ground line 10 which constitutes the negative terminal of a direct-current voltage source having a positive terminal B. The anode of the mixer tube 11 is connected through a radio frequency choke coil 14 to the positive terminal B and is likewise connected through a capacitor 15 and a resistor 16 to the ground lead 10. The common terminal of the capacitor 15 and the resistor 16 is connected to the control grid of an electron tube 17 which is biased for class C operation. The anode of the tube 17 is connected through a capacitor 18 to a second control electrode in the tube 11 and to the ground lead 10 through a resistor 19. A second grid electrode in the tube 17 is connected to the positive terminal B through a resistor 21 and is connected to the negative lead through a capacitor 22. The anode of the tube 17 is connected to one common terminal of a resonant tank circuit comprising a variable capacitor 23 and an inductor 24, the other terminal of said capacitor 23 and inductor 24 being connected to the positive terminal B and being connected to the ground lead 10 through a capacitor 25. The anode of the tube 17 is likewise connected to the anode of a reactance tube 26, of a type well known in the art, through a capacitor 27 and is connected to the ground lead 10 to a second capacitor 28 and a resistor 29.

The common terminal of the capacitor 28 and resistor 29 is connected to one control electrode of the reactance tube 26, and the cathode of the tube 26 is connected through a cathode resistor 31 having a by-pass capacitor 32 to the ground lead 10. The anode of the tube 26 is connected to the positive terminal B through a radio frequency choke coil 33 and is connected through a capacitor 34 to the control electrode of a phase comparitor tube 35. The anode of the phase comparitor tube 35 is connected to the positive terminal B and its cathode is connected to a second grid electrode in the reactance tube 26 and is also connected to ground lead 10 through a cathode resistor 36 shunted by a by-pass capacitor 37. The common terminal of the inductor 6 and capacitor 7 is connected through another capacitor 38 to a second grid electrode in the phase comparitor tube 35 and the last-mentioned control electrode is connected to the ground lead 10 through a resistor 39. Output terminals 41, 42 are connected to the ground lead 10 and to the anode of amplifier tube 17. The cathode of the amplifier tube 17 is connected to the ground lead 10 through a resistor 43 having a by-pass capacitor 44 which is so adjusted as to bias the tube 17 so that it conducts current only at the very peak of the alternating voltage wave in the tank circuit 23, 24.

Referring to the previous description of the principles of my invention, the resonant circuit 4, 5 acts as a filter to accentuate the desired component of the input frequency and to minimize other components. The resulting voltage wave is clipped and given a relatively flat top through the action of the clipper tube 8 which impresses it on the input to the tube 11. The output of the tube 11 is impressed on one of the control electrodes of the amplifier tube 17 through the coupling 15, 16, and the output of the amplifier tube 17 energizes the tank circuit 23, 24.

The capacitor 23 and inductor 24 constitutes a tank circuit for the tube 17, and the capacitor 18 and resistor 19 constitute an energy feedback to the grid of tube 11 such that the coupling comprising capacitor 15 and resistor 16 impresses a regenerative effect on the control grid of tube 17. This regenerative effect is made of such magnitude that, except for the high negative bias resulting from the presence of cathode resistor 43, the tube 17 would vigorously oscillate. However, this negative bias is made so large that the feedback voltage is insufficient to cause oscillation of the tube 17 when no clipped voltage pulses are being impressed on tube 11 by winding 6. On the other hand, when such clipped voltage pulses are being impressed, the bias of tube 17 is made just sufficient to cause current to flow from anode to cathode therein, and this results in the production of an oscillatory current flowing in the tank circuit 23, 24. The bias of tube 17 is made such that current flows from its anode to cathode for only a short space of time at the peak of the alternating-current voltage in tank circuit 23, 24. Thus energy capable of offsetting the electrical losses due to this oscillatory current in tank circuit 23, 24 is supplied in short pulses or jets once for each cycle therein.

As previously stated, it is essential that the tank circuit 23, 24 oscillate at the dominant frequency present in the input network 4, 5. In order to maintain the tuning of the tank circuit at just the correct value to insure this result, the tube 26, a reactance tube is provided. The circuit connections of this tube will readily be seen to be such as to constitute what is known in the art as a "reactance tube"; in other words, it draws through the coupling comprising capacitor 27 a current which is 90 degrees out of phase with the voltage across its terminals. The amount of this current can be varied by changing the bias on one of the control electrodes of tube 26; hence it constitutes, in effect, a means of varying the reactance, and hence the tuning of the tank circuit 23, 24 in accordance with the direct-current voltage impressed on the control electrode of tube 26.

The phase comparator tube 35 is a device which produces a direct-current output voltage across its cathode resistor 36 which is dependent, in magnitude and sign, on the difference between the phase of the above-mentioned tank circuit of tube 17 and the dominant frequency voltage impressed by winding 6 through capacitor 38 and resistor 39 on a control electrode in tube 35. The coupling from the tank circuit of tube 17 through capacitor 34 and the coupling to winding 6 through capacitor 38 and resistor 39 are so proportioned in ways well known in the art that, when the dominant frequency voltage in winding 6 is exactly in phase with the voltage of the tank circuit, the voltages impressed on the control electrodes of tube 35 are 90 degrees out of phase with each other. If now the equivalent reactance introduced into the tank circuit of tube 17 by the reactance tube 26 is too great to tune that tank circuit to the dominant frequency in winding 6, the voltage impressed through capacitor 34 on tube 35 will begin to lag from its 90 degree relation to the voltage impressed through capacitor 38 on the other control electrode of tube 35, and this will cause a decrease in output current sent by tube 35 through the cathode resistor 36. This will make the potential impressed by resistor 36 on the control electrode of reactance tube 26 less positive and result in a decrease in current flow through that tube, and hence will result in a decrease of the equivalent reactance which reactance tube 26 introduces in the tank circuit of tube 17. This decrease of reactance will, in effect, tune the tank circuit of tube 17 to a higher frequency, thereby making the necessary adjustment in tuning to bring the resonant circuit into tune with the dominant frequency impressed by winding 6.

If the equivalent reactance introduced in the tank circuit of tube 17 by reactance tube 26 is too small to produce the desired tuning, the voltage impressed through capacitor 34 on tube 35 will begin to lead the voltage impressed on tube 35 from winding 6; this will increase the current flowing through cathode resistor 36 and correspondingly increase the equivalent reactive current introduced by reactance tube 26 in the tank circuit of tube 17. In short, the reactance tube 26 and phase comparator tube, 35 constitute a device for automatically adjusting the equivalent reactance of the tank circuit of tube 17 to maintain it always tuned to the dominant frequency present in winding 6.

While I have described a reactance tube as the means required to correct the tuning of the tank circuit of tube 17 to maintain resonance with the dominant frequency in winding 6, other means such as variable condensers, motor-actuated by the direct-current output of tube 35, are well known in the art and may be substituted for the reactance tube 26. Saturated reactors are also a known substitute for the variable reactance tube responsive to direct-current control. Likewise, other discriminator circuits capable of producing a direct-current voltage varying in magnitude and sign, with the discrepancy between the resonant frequency of a tank circuit and the frequency of a control voltage, are known and may be substituted for the phase comparitor shown in my drawing.

I claim as my invention:

1. In combination with a source of input voltage having components of a plurality of different frequencies, a clipper means having said voltage impressed on its input and having an output circuit, an electron tube having a negatively biased control electrode impressed with voltage from said output circuit, and a tank circuit energized from the principal electrodes of said tube and tuned substantially to one of said frequencies, a feedback circuit tending to produce self-oscillation in said tube and supplied with energy from said tank circuit, and means for applying a negative bias to said control electrode sufficient to prevent the production of oscillations in said tube when said source is deenergized, but sufficient to produce oscillations in said tube when said source is energized by substantial currents of said one of said frequencies.

2. In combination with a source of input voltage having components of a plurality of different frequencies, a clipper means having said voltage impressed on its input and having an output circuit, an electron tube having a negatively biased control electrode impressed with voltage from said output circuit, and a tank circuit energized from the principal electrodes of said tube and tuned substantially to one of said frequencies, a feedback circuit tending to produce self-oscillation in said tube and supplied with energy from said tank circuit, and means for applying a negative bias to said control electrode sufficient to prevent the production of oscillations in said tube when said source is deenergized, but sufficient to produce oscillations in said tube when said source is energized by substantial currents of said one of said frequencies, said tank circuit being provided with means for automatically maintaining it tuned to said one of said frequencies.

CYRIL E. McCLELLAN.

REFERENCES CITED

The following references are of record in the file of this patent:

UNITED STATES PATENTS

| Number | Name | Date |
|---|---|---|
| 1,291,527 | Hull | Jan. 14, 1919 |
| 1,889,083 | Wintringham | Nov. 29, 1932 |
| 2,053,841 | Prescott | Sept. 8, 1936 |
| 2,197,239 | Farrington | Apr. 16, 1940 |
| 2,277,000 | Bingley | Mar. 17, 1942 |
| 2,282,271 | Terroni et al. | May 5, 1942 |
| 2,359,504 | Baldwin | Oct. 3, 1944 |
| 2,403,615 | Sanders | July 9, 1946 |
| 2,405,771 | Ziegler | Aug. 13, 1946 |
| 2,425,314 | Hansell | Aug. 12, 1947 |